United States Patent [19]
Lande et al.

[11] Patent Number: 5,138,904
[45] Date of Patent: Aug. 18, 1992

[54] ROBOT SYSTEM

[75] Inventors: Maurice Lande; Alex Renault, both of Birmingham; Lawrence P. Tessler, Ann Arbor, all of Mich.

[73] Assignee: AKR Robotics, Inc., Addison, Ill.

[21] Appl. No.: 532,528

[22] Filed: Jun. 4, 1990

[51] Int. Cl.$^5$ .................. F16C 3/04; F16H 47/00; B25J 11/00
[52] U.S. Cl. .................. 74/661; 74/665 B; 901/9; 901/22
[58] Field of Search .............. 74/404, 655, 661, 665 B

[56] References Cited
U.S. PATENT DOCUMENTS

| | | | |
|---|---|---|---|
| 3,310,998 | 3/1967 | Harmening | 74/661 |
| 3,576,106 | 4/1971 | Nowicki et al. | 74/661 X |
| 4,520,910 | 6/1985 | de Hertel Eastcott et al. | 74/661 X |
| 4,858,490 | 8/1989 | Grant | 74/661 |

Primary Examiner—Allan D. Herrmann
Assistant Examiner—David W. Laub
Attorney, Agent, or Firm—Baker & McKenzie

[57] ABSTRACT

This invention relates generally to robots and specifically to a robot for spraying applications which has the ability to accurately follow trajectories that require high speeds and accelerations, a working envelope appropriate for processing the sides, top, and bottom of a large object such as an aircraft, an integrated revolute joint and actuator for supplying power to the movable components of the robot along protected, low maintenance power paths, a zero backlash drive, and a gravity compensating system which causes the robot to be neutrally balanced throughout its entire working envelope even while carrying a payload of significant weight.

5 Claims, 9 Drawing Sheets

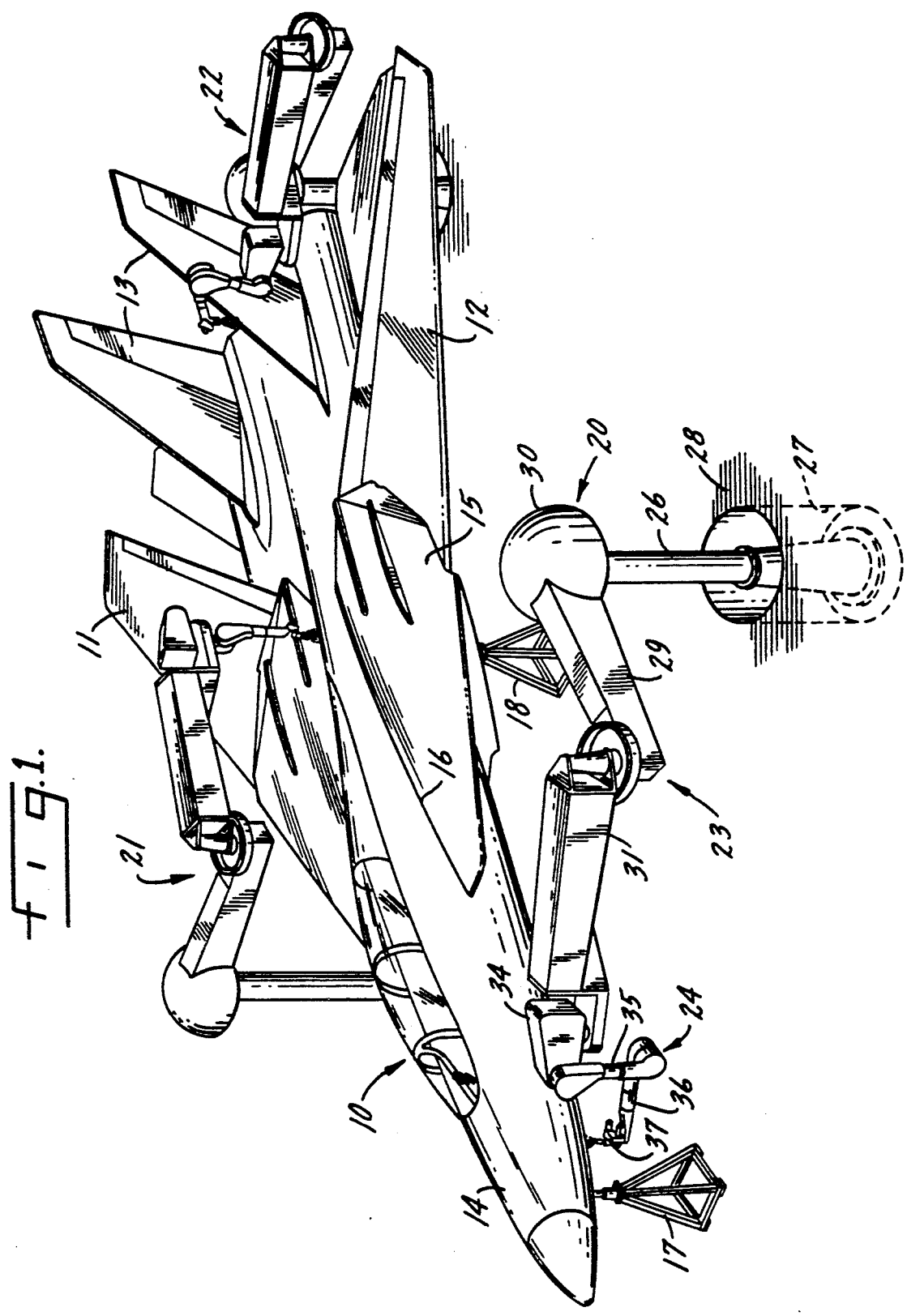

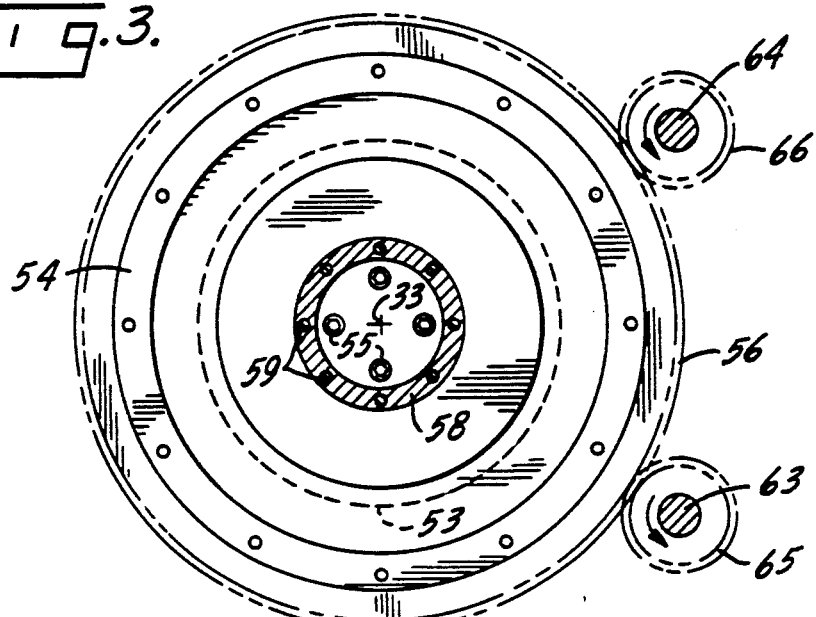
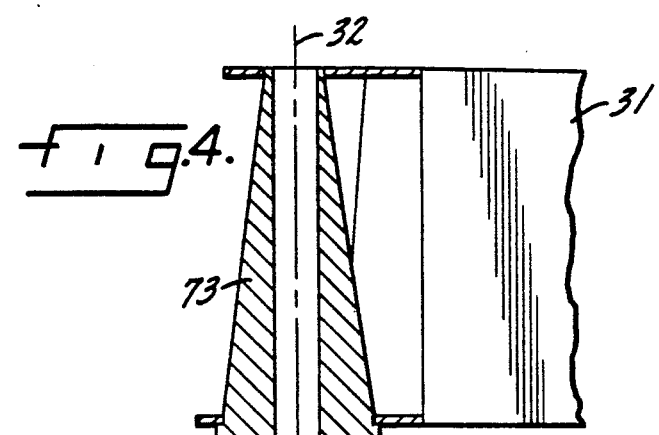
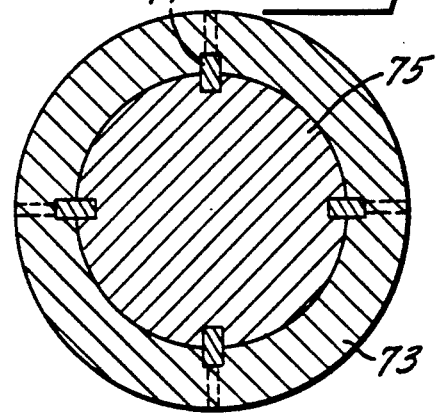
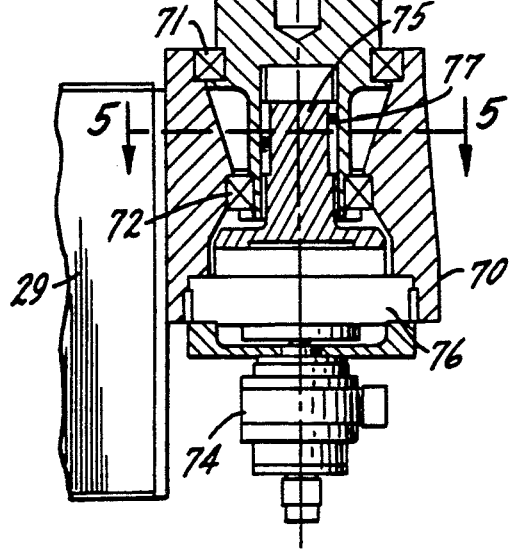
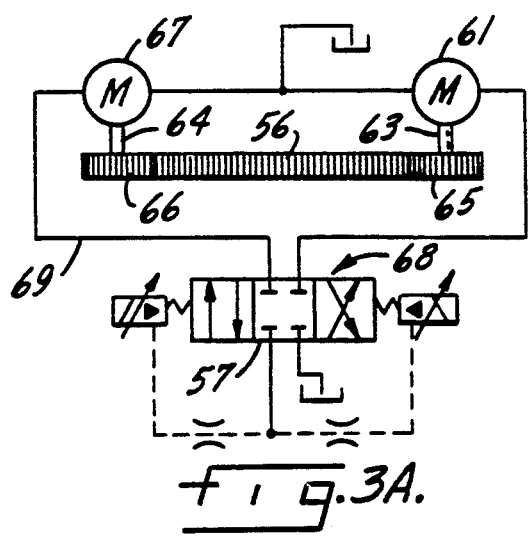

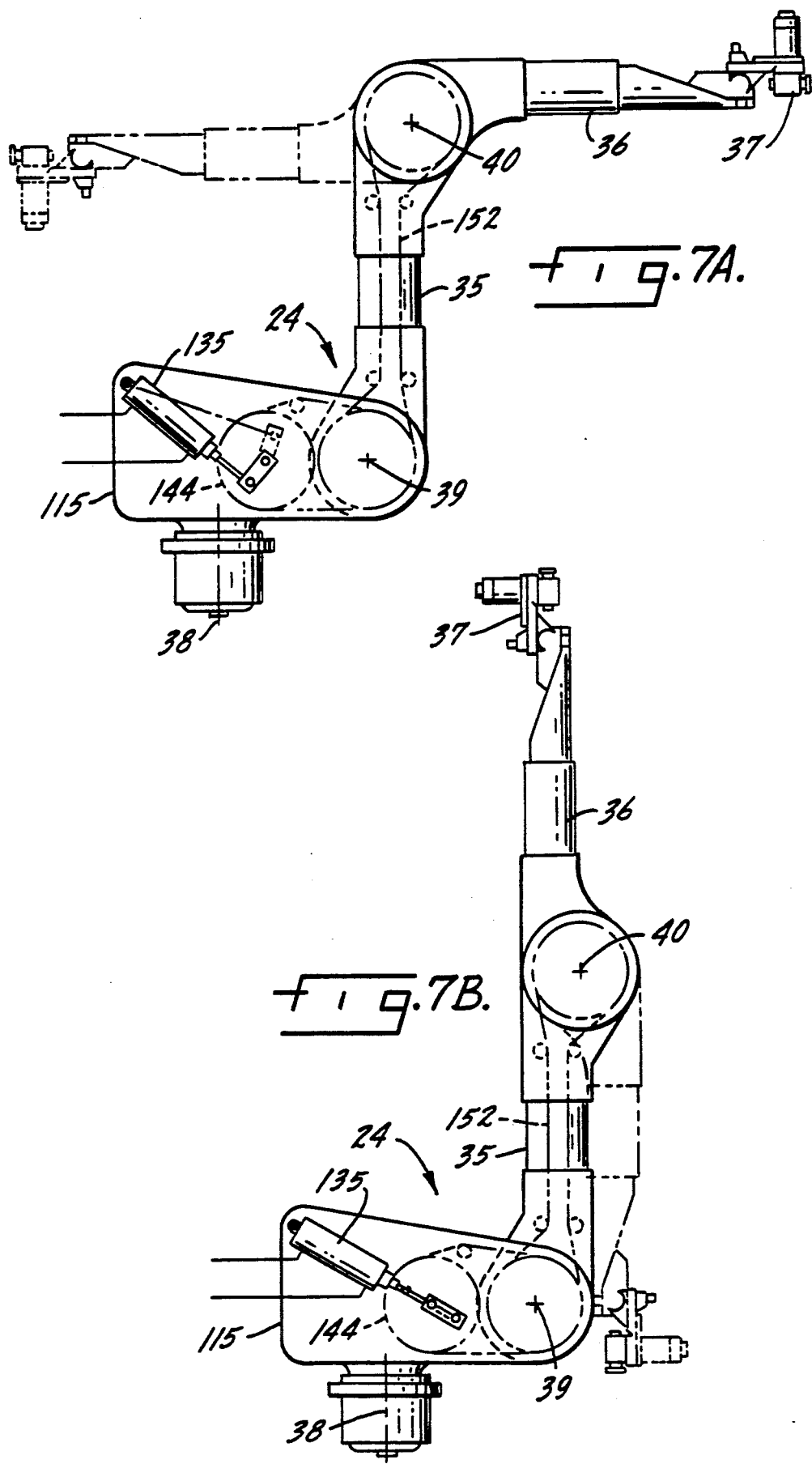

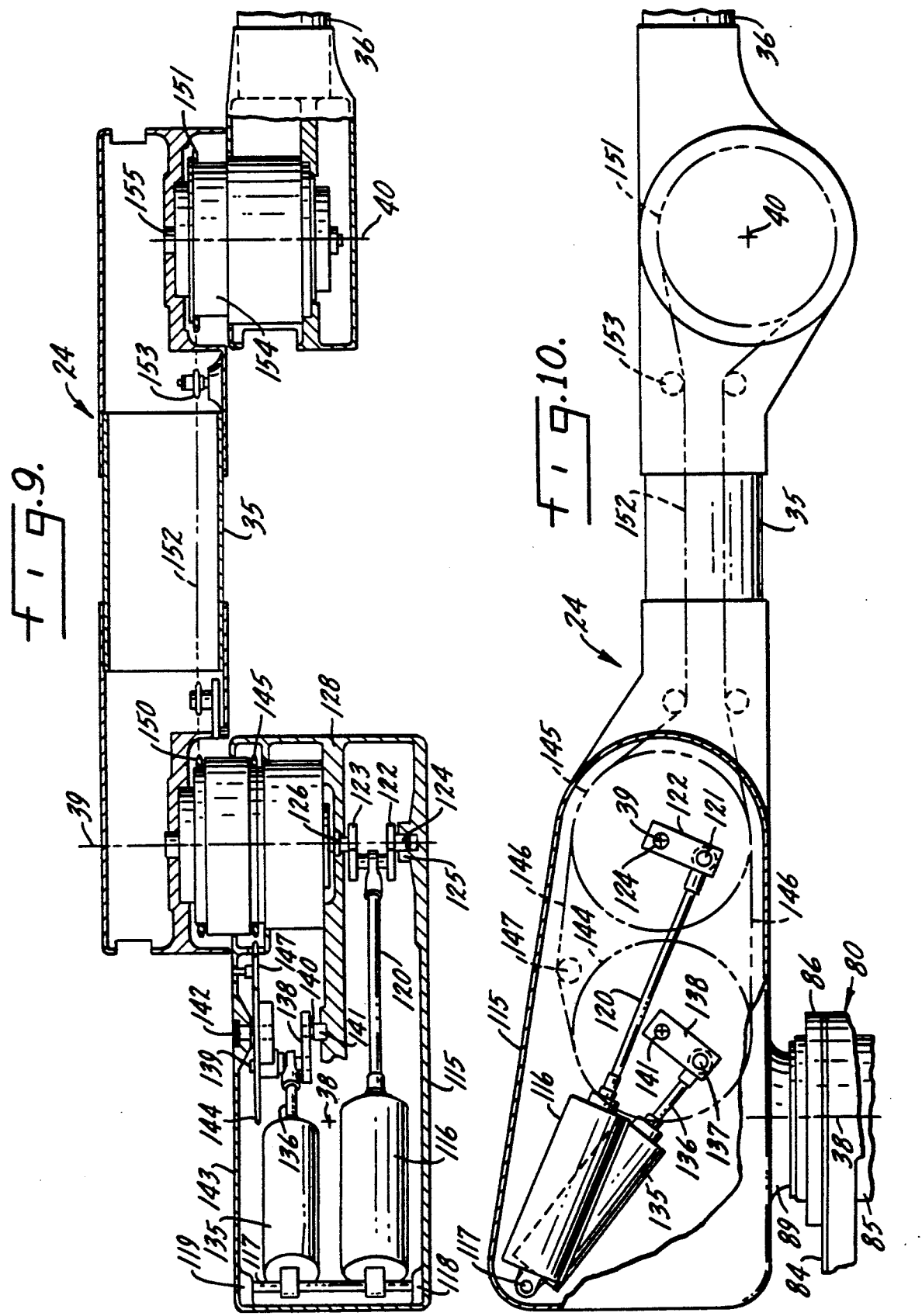

ROBOT SYSTEM

BACKGROUND OF THE INVENTION

Robot systems for coating, and specifically paint spraying, are now well established particularly for production line use in applications in which relatively flat, easy to access surfaces are presented to the spray gun such as parts moving along an assembly line The robot moves and coordinated gun operations in such systems are relatively simple and have been developed to a high degree A need exists, however, for a robot spray gun system which is adapted to apply coatings to large, non-regular surfaces in a very precise and controlled pattern. One such application is the aerospace industry where large, irregularly shaped structures must be coated. An airplane is a good example of such an application. Today's aircraft standards are exceedingly high as compared to only a few years ago and present robot systems are either too slow, not sufficiently accurate, cannot access all surfaces, or not cost efficient, and usually a combination of some or all of the foregoing Military aircraft, for example, may require up to 50 very thin coating applications on some exposed surfaces, and the time required to meet this standard with present equipment is unacceptably long and, often, of insufficient quality. As will be appreciated such structures as airplanes have flat surfaces, numerous junctions, but mostly curvilinear contours, all of which dictate that the robot must operate with a very high degree of precision.

Accordingly, objectives of this invention are to provide a robot with the ability to follow complex trajectories that require widely varying speeds and high acceleration, an enormous useful work envelope, low maintenance, particularly as regards malfunction of hydraulic and electrical lines and components which, because of their generally exposed conditions, are subject to damage and consequent malfunction, and counter balanced coating application; i.e., a coating applicator which has the capacity of near instantaneous response to motion commands due in part to the absence of gravitational torque in the system.

In a specific embodiment of the invention a fully integrated robot system is provided which is capable of painting an entire aircraft The system includes a transporter sub-system which carries a robot sub-system. The transporter is provided with three degrees of freedom, namely, a vertical; i.e., a Z axis movement for the entire system, a first horizontal rotational movement provided by a first-boom which rotates about the Z axis, and a second horizontal rotational movement provided by a second boom or arm which rotates about a vertical axis carried by the first boom at the point of attachment of the first boom to the second boom. The robot sub-system has six degrees of freedom, said sub-system being mounted at the end of the second boom or arm of the transporter. Preferably the robot sub-system has a first degree of freedom about a vertical axis, a second degree of freedom about a first horizontal axis, a third degree of freedom about a second horizontal axis which is parallel to the first horizontal axis, and a wrist mechanism capable of movements about roll, pitch, and yaw axis.

Further attributes of such a system are that (i) the work envelope is dramatically increased over prior systems, (ii) oil connections are made through integrated multi-port swivel fittings, (iii) all leak paths drain back to tank thus making the system virtually leak free, (iv) the hydraulic connections are totally enclosed within the robot arm and base and therefore protected to the maximum extent possible which results in low maintenance and a smooth, clean look, (v) overhanging structures which currently are common are not present, (vi) reliability is increased, and (vii) the work envelope has redundant access to achieve 100% attainability to all surfaces to be coated.

BRIEF DESCRIPTION OF THE DRAWING

The invention is illustrated more or less diagrammatically in the accompanying drawing in which FIG. 1 is a perspective of the robot system of this invention as applied to the coating of a military airplane;

FIG. 3 is a view taken substantial along the line 3—3 of FIG. 2A showing the backlash-free drive system which provides near instantaneous response to system commands;

FIG. 3A is a diagrammatic illustration of the hydraulic system for the drive system shown best in FIGS. 2A and 3;

FIG. 4 is a view partly in section, of the joint between the two booms or arms of the transporter sub-system;

FIG. 5 is a view taken substantially along the line 5—5 of FIG. 4;

FIG. 7A is an elevation showing the upper arm in positions of maximum gravitational torque;

FIG. 7B is an elevation showing the upper arm of the robot sub-system in a position of minimum gravitational torque;

FIG. 9 is a plan view of the gravitational torque compensating cylinders and the power train for the upper arm of the robot arm sub-system;

FIG. 10 is an elevation of the portion of the robot arm sub-system shown in FIG. 9.

Figure 2A:
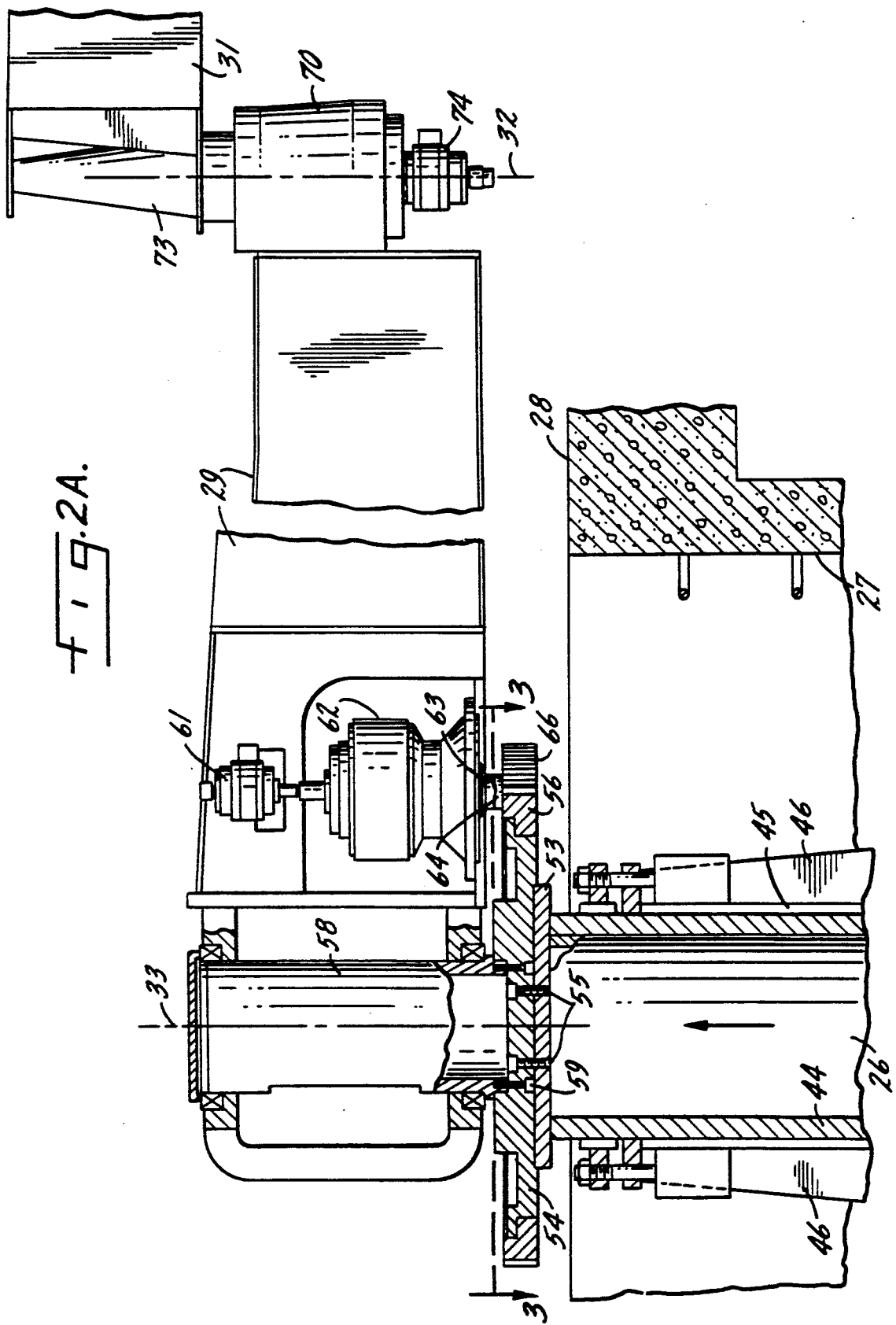
FIG. 2, which consists of sub-parts 2A and 2B, illustrates the transporter sub-system with the work envelope shown in phantom in FIG. 2B.

Referring first to FIGS. 1-5, and initially to FIG. 1, a work piece to be coated, in this instance a military airplane, is indicated generally at 10. As will be noted the plane has several relatively flat surfaces, such as the wing sections 11 and 12 and tail section 13, but it is composed mainly of curved surfaces 14, 15 which meet at numerous junctions 16. Some of the curved surfaces are uniformly curved and others are not.

The plane is supported by work stands 17 and 18 to keep it in a fixed position for coating. For purposes of description the coating will hereafter be referred to as paint.

Three robot systems of this invention are indicated generally at 20, 21, and 22. In this instance three robot systems have been found sufficient to paint the plane and all are operated simultaneously by a controller, not shown. Since the construction and operation of each system is identical, only one will be described in detail.

Robot system 20 is composed of a transporter sub-system, indicated generally at 23, and a robot sub-system, indicated generally at 24. The transporter sub-system includes hydraulic column 26 which reciprocates along a vertical or Z axis. The column 26 projects from a housing 27 whose upper edge is flush with the plane of the floor 28. A first boom or arm 29 is carried by and rotatable with the upper end of column 26. A half-bubble housing 30 covers and protects the upper end of the hydraulic column and the joint between the column and boom 29. A second boom is indicated at 31, said second boom being mounted on the distal end of boom 29 and rotatable about a vertical axis 32, see FIGS. 2A and 4, at the end of boom 29.

The robot arm sub-system 24 includes a base 34, a lower arm 35, and an upper arm 36. A paint spray gun 37 is attached to a wrist mechanism that is carried at the outer end of the upper arm 36. It will be understood that pitch and yaw and roll movements are attainable by the paint spray gun, but since this invention is not specifically directed to the mounting and movement of the spray guns, this feature is not further described. The vertical axis about which the base 34 rotates is indicated at 38, see FIG. 2B, the horizontal axis about which the lower arm 35 rotates is indicated at 39, see FIG. 2B, and the horizontal axis about which upper arm 36 rotates is indicated at 40, see FIG. 2B.

Figure 2B:
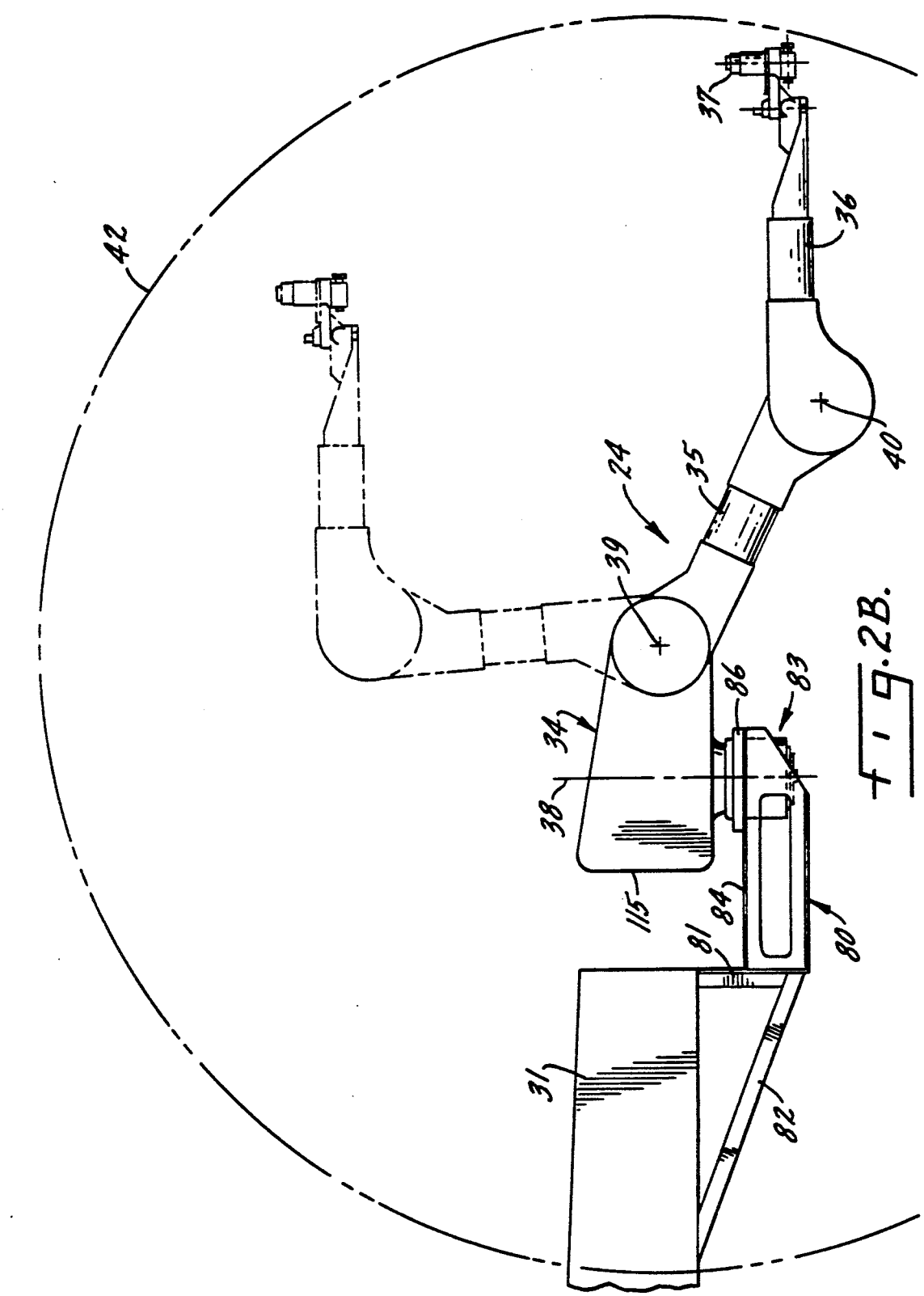

From FIGS. 2B, 7B, 9 and 10 it will be noted that the work envelope and the robot arm sub-system is very large, a vertical cross section of which is indicated at 42 in FIG. 2B.

The transporter sub-system 23 is best illustrated in FIGS. 2, 3, 4 and 5.

In FIG. 2A the hydraulic column 26 is shown in a near-fully retracted position in its stationery sleeve or housing 44. Sleeve 44 is held in an exact vertical position by a frame work 45 which includes a plurality of vertical, angled reinforcing struts 46.

A mounting plate 53 is carried by the upper end of column 26. A ring gear mount 54 is releasably secured to mounting plate 53 by bolts 55, and a ring gear 56 is mounted on the gear mount 54 by any suitable means.

The transporter arm mounting shaft is indicated at 58. The shaft is secured to ring gear mount 54 by bolts 59. The first boom 29 rotates about the transporter arm shaft 58 on bearings not numbered Thus boom 29 rotates about shaft 58 which is fixed with ring gear 56, and the hydraulic column 26.

Means for rotating boom 29 are illustrated best in FIGS. 2A, 3 and 3A.

Hydraulic motor means are indicated generally at 61 in FIG. 2A and a speed reducer at 62. An output shaft is indicated at 63 in FIGS. 2A and 3. From FIGS. 3 and 3A it will be seen that a second hydraulic motor means 67 and speed reducer arrangement drives a second shaft 64. Shafts 63, 64 drive spur gears 65, 66, respectively, which engage ring gear 56. From FIGS. 3 and 3A it will be noted that during operation the motor 61, 67 continuously operate in opposition to one another with respect to the ring gear 56. Thus, when motor 61 drives ring gear 26 in a clockwise direction, motor 67 will exert an opposing, driving force on ring gear 26 in a counter-clockwise direction. However, since the clockwise driving force of motor 61 may be 100-ft-lbs, and the counter-clockwise driving force of motor 67 may be only 10 ft-lbs, the net result will be a clockwise driving force to 90-ft-lbs. through valving 68 and its associated circuitry 69. It will further be noted that, depending on the position of control valve spool 57, one of motors 61 or 67 will overpower the other and drive against it. As a consequence ring gear 56 will, almost instantaneously upon decrease in driving power from the motor which is dominant at a given moment, rotate in the opposite direction under control of the other motor which takes over as the dominant driver This instant response is essential to achieving a quick change of direction at the spray head when the contour of the work piece changes, all as earlier described. This drive system eliminates backlash as both pinions experience torque in only one direction and one and only one side of a tooth is ever in contact with the ring gear.

The mounting of second or outer boom 31 to the first or inner boom 29 is illustrated best in FIGS. 2A, 4 and 5. From FIGS. 2A and 4 it will be seen that a motor and pivot support housing 70 is secured to the outer end of boom 29. The housing carries bearings 71, 72 which support a second boom shaft 73 to which the second boom 31 is secured as by welding. The shaft and boom is powered by motor 74 which drives a power shaft 75 through a gear reducer 76. Power shaft 75 is keyed to boom shaft 73 by keys 77. Hence, as second boom 31 rotates about axis 32, the robot arm assembly of FIG. 2B will swing in horizontal arcs about axis 32.

Figure 6:
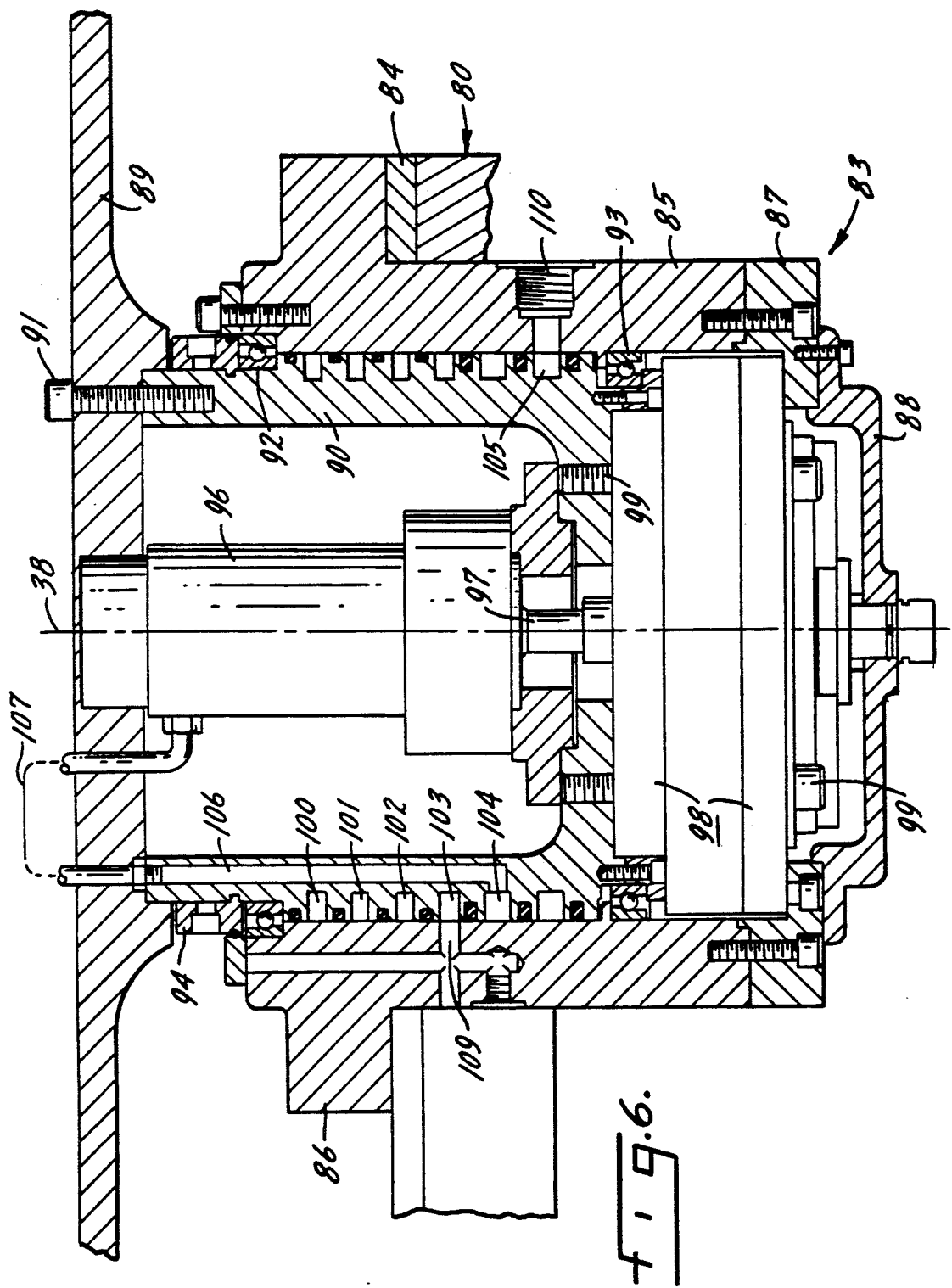
FIG. 6 is an axial section of an integrated revolute joint and actuator for the robot arm sub-system of FIG. 2B.
Figure 8A:
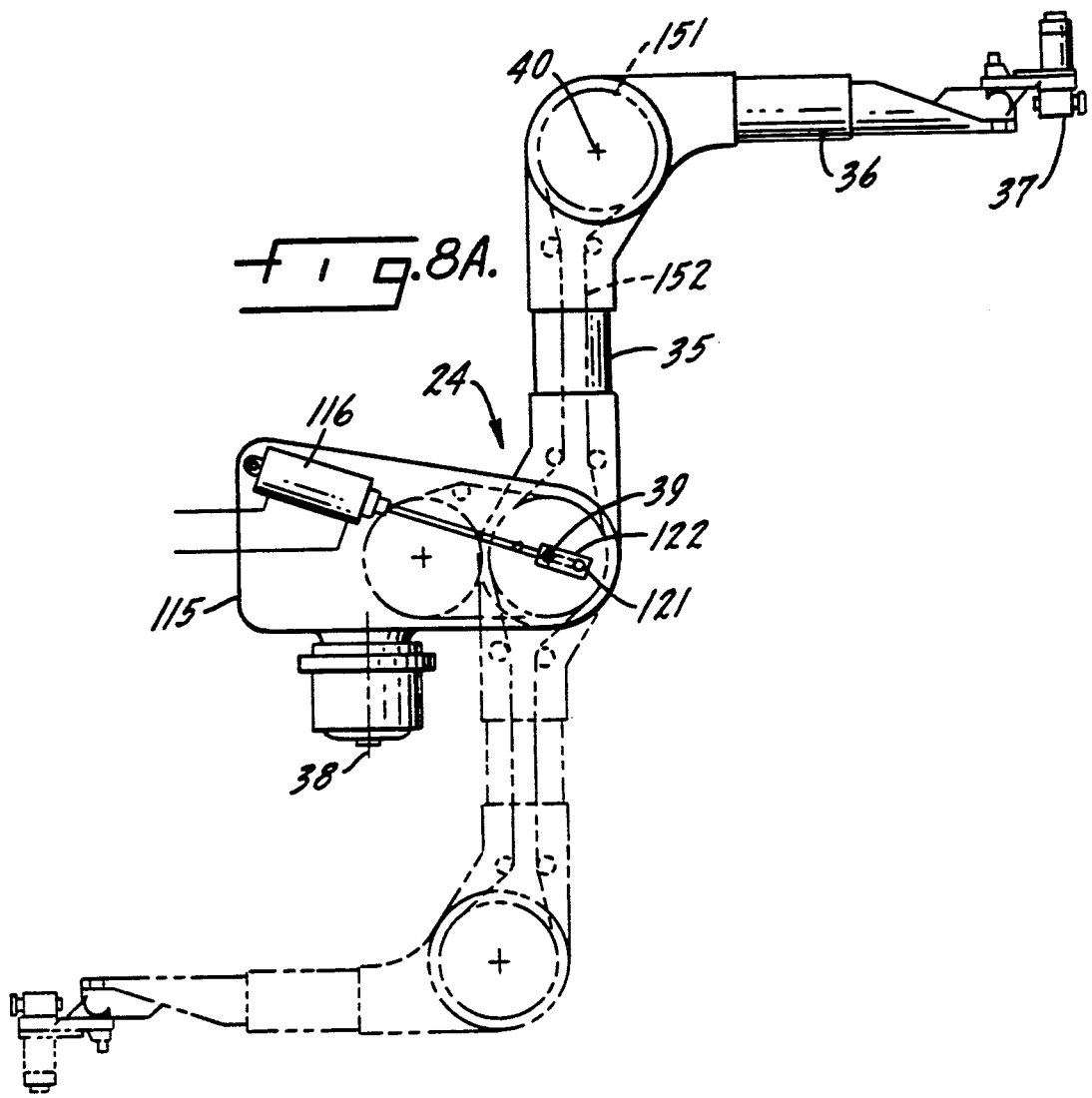
FIG. 8A is an elevation showing the lower arm of the robot arm sub-system in positions of minimum gravitational torque.
Figure 8B:
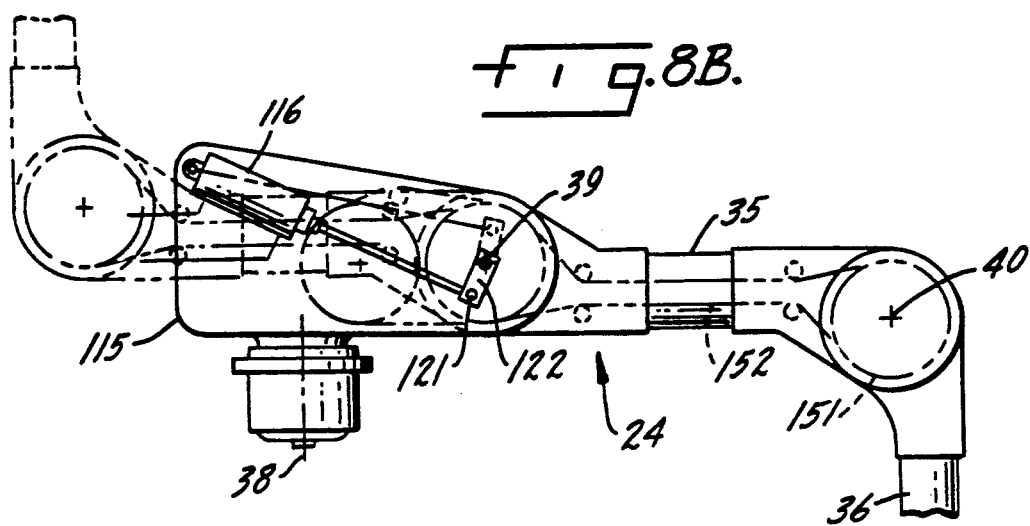
FIG. 8B is an elevation showing the lower arm of the robot arm sub-system in positions of maximum gravitational torque.

An integrated revolute joint and actuator is illustrated best in FIGS. 2B and 6. This feature makes possible the placement of all air, oil and drain within the links in the robot arm sub-system so that the possibility of malfunction due to accidental contact with exposed lines is eliminated. This feature also provides a continuous pressure lubricated joint which is very compact and efficient.

Referring first to FIG. 2B it will be seen that outer boom arm 31 includes a robot arm sub-system mounting platform, indicated generally at 80, which is secured to the outer end of arm 31 by struts 81 and braces 82. The integrated revolute joint and actuator is indicated generally 83 and is bolted to the platform base 84 of the mounting platform 80, as indicated in FIG. 6.

The joint-actuator includes a valve body 85 having a mounting flange 86 by which it may be bolted to platform base 84. A valve body end cap is indicated at 87, and a close off end cap at 88. The base plate 89 of the robot arm sub-assembly, which will be described hereinafter, is bolted to valve spool 90 by bolts 91 and hence the base plate 89, and thus the robot arm sub-system rotates with respect to boom arm 31 about vertical axis 38. Upper and lower spaced bearings are indicated at 92, 93 respectively, and a bearing retaining ring is shown at 94.

A hydraulic motor is indicated at 96, its output shaft at 97, and a gear reducer at 98 It will be understood that the output shaft 97 of motor 96 engages a drive gear within the gear reducer, which drive gear in turn engages planetary gears which in turn engage an internal ring gear, all in a conventional manner. Since the housing of the gear reducer 98 which carries the inner planetary gear is secured to the valve body by bolts 99, it will be seen that rotation of motor 96 will cause base plate 89, and hence the robot arm sub-system, to rotate with respect to boom arm 31.

A plurality of circumferential passages are formed in the periphery of valve spool 90 at 100, 101, 102, 103, 104, and 105. These may be, for example, for air to joint 3 (100), air to joint 2 (101), air to joint 1 (102), hydraulic drain (103), hydraulic pressure (104), and hydraulic return (105). In the exemplary showing of FIG. 6, an internal vertical passageway 106 in the valve spool 108 connects hydraulic pressure passageway 104 with a pressure hose 107 to motor 96 for driving the motor in a desired direction The circular pressure passageway 104 would, in turn, connect with an outlet port in the valve body 108 which would in turn connect to a hydraulic pressure line from a pump or other source of pressure so that high pressure liquid can drive the motor. By way of further illustration, the drain passageway 103 is, in the position shown, in communication with a radial passage 109 which connects with a drain hose, not shown.

Further, a return port 110 in the valve body communicates with circular return passageway 105 in the valve spool to provide a path for liquid from downstream joint/actuators to return to tank through joint/actuator 83. It will be understood that the return line from motor 96 will connect with a vertical passage similar to pressure passage 106, but at a different peripheral location, which in turn will open into passage 105 so that spent fluid from motor 96 can return to tank.

By arranging the air and oil lines in this fashion all piping can be internalized within the robot arm sub-system, to be described hereafter, so that all joints are lubricated under pressure and the risk of external leaks, injury, or damage to the fluid is virtually eliminated.

The robot sub-system 24, and particularly the gravitational compensating feature thereof, is illustrated best in FIG. 7A, 7B, 8A, 8B, 9, 10, and 11 to which reference is now made. It will be understood as discussed above that precise control of the paint spray gun 37 is essential in critical applications, such as coating aerospace vehicles, and that attainment of precise control in a system of the type herein described is very difficult in view of the long cantilever effect of the robot sub-system about the transporter axis 33, see FIG. 2A, of the hydraulic column 26 The gravitational compensating system in the above Figures enables precise control to be obtained so that the tight performance specifications which this system must meet are attained.

Figure 11:
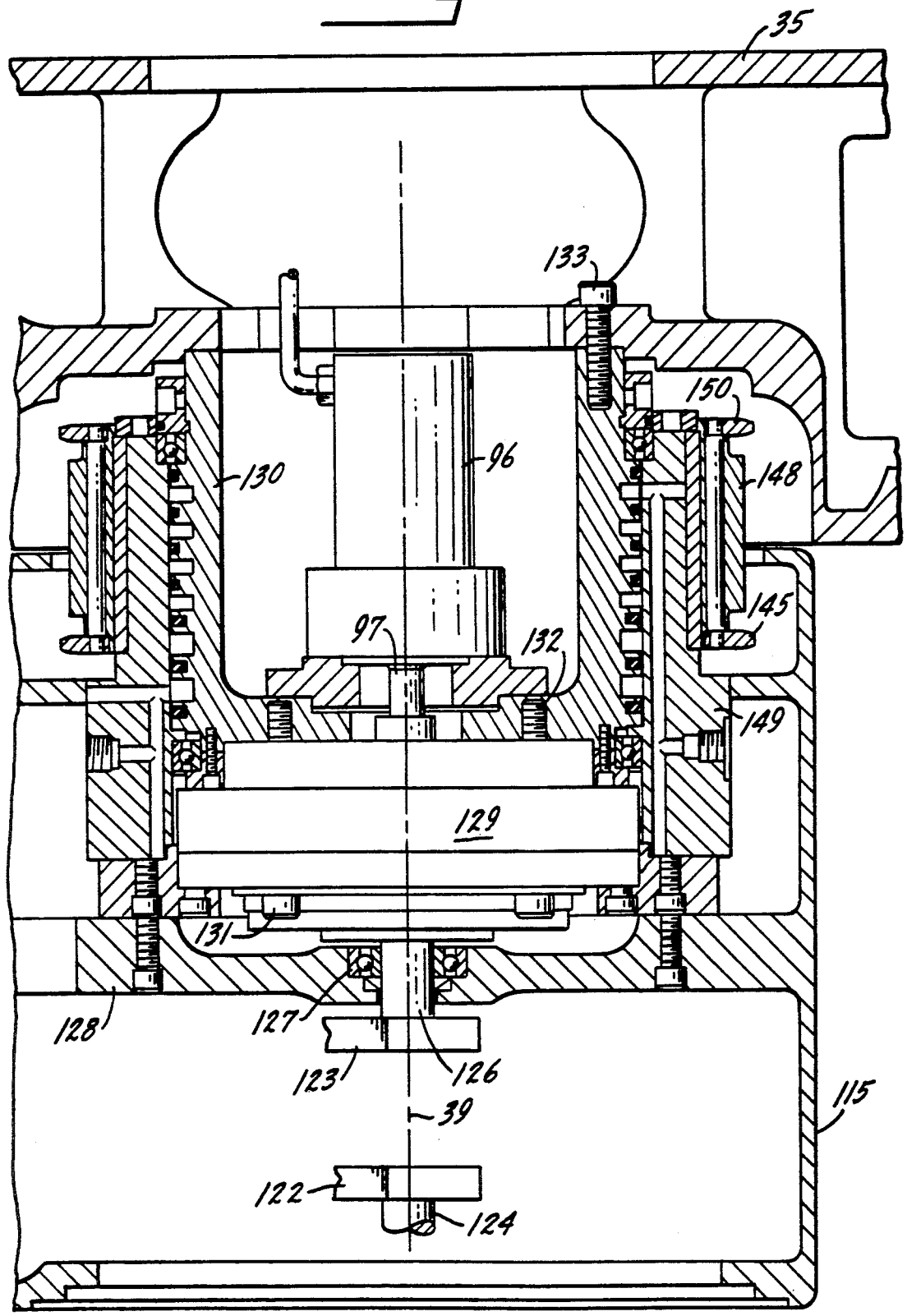
FIG. 11 is a plan view in section of the power transfer through the base of the robot arm sub-system of FIG. 9.

Referring first to FIGS. 9, 10, and 11 the robot base of the robot sub-system is indicated at generally 115, base 115 including base plate 89 As best seen in FIG. 9, lower arm 35 of the robot arm sub-system is linked to robot base 115 about horizontal axis 39, and the upper arm 36 of the robot arm sub-system is linked to the lower arm about upper arm axis 40. Upper arm 35 is offset from lower arm 36.

The system for rotating lower arm 35 about horizontal axis 39 includes pneumatic arc cylinder 116 whose inner, or left, end in this instance is mounted for pivotal rotation about a pivot bar 117 which is seated in blocks 118, 119 which are fast with robot base 115. Piston rod 120 of cylinder 116 is pivotally connected as at 121 to crank links 122, 123. The outer end of link 122 is fast with stub shaft 124 which is received in a shaft seat 125 which in turn is fast with the base 115. Crank link 123 is fast with a shaft 126 which is co-axial with stub shaft 124. Shaft 126 is received in bearing 127 which is seated in a recess in center wall 128 of the robot base 115. Shaft 126 is fast with a gear case 129 which contains a planetary gear system. The outer rim of the planetary gear system is bolted to a valve spool 130 by a plurality of bolts, two of which are indicated at 131, 132. The spool 130 is, in turn, bolted to lower arm 35 by a plurality of bolts, one of which is indicated at 133.

It will thus be seen that when piston rod 120 is extended and retracted, arm 35 will rotate about the horizontal axis 39 of shafts 124, 126 through valve spool 130. The degree of movement is such that arm 35 can be positioned at all locations required to define envelope 42 and, preferably, 360 degrees. When arm 35 is rotated to the solid line position of FIGS. 1 and 8A, and the phantom of FIG. 8A, the gravitational torque attributable to arm 35 will be a minimum. Moment arm calculations within the skill of the art about axis 39 as a reference point will disclose that with constant pressure of a valve dependent on the weight of the lower arm 35 supplied to cylinder 116 the sum of the opposing moments equals zero whereby the effect of the weight of arm 35 is effectively reduced to zero and hence all the power available from the joint actuator can be used to accelerate the motion of the arm.

The system for rotating upper arm 36 about axis 40 includes a small cylinder 135 whose inner or left end in this instance is mounted for pivotal rotation about pivot bar 117. Piston rod 136 of cylinder 135 is pivotally connected as at 137, see FIG. 10, to upper arm crank links 138, 139. The outer end of link 138 is fast with stub shaft 140 which is rotatably received in a shaft seat 141 carried by center wall 128 of robot base 115. The outer end of link 139 is fast with a shaft 142 which is co-axial with shaft 140. Shaft 142 is received in a bearing, not shown in FIGS. 9 or 11, which is seated in a recess in wall 143.

Shaft 142 is fast with a first drive sprocket 144 which drives sprocket 145 through roller chain 146, see FIG. 10, over a tension adjustment idler 147. Sprocket 145 is secured to a power transmission sleeve 148, see FIG. 11, which in turn is carried by the valve body 149, the valve body 149 receiving the valve spool 130.

A second or slave drive sprocket is indicated at 150, said second sprocket 150 being fast with the power sleeve 148. It will thus be seen that sprocket 145 functions as a driven sprocket; i.e.: with respect to first drive sprocket 144, and, also, as a driving sprocket; i.e.: with respect to second or slave sprocket 150. Second drive sprocket 150 drives an upper arm sprocket 151 through roller chain 152 and over tensioning idler 153. Upper ar sprocket 151 is fast with a drive sleeve 154 which, in turn, is secured by any suitable means to the robot sub-system upper arm 36.

It will thus be seen that when piston rod 136 is extended and retracted, the robot sub-system upper arm 36 will rotate about the axis 40 of upper arm shaft 155. The degree of movement is such that arm 36 can be positioned, in conjunction with arm 35, in all locations required to define envelope 42 and, preferably 360 degrees. When arm 36 is rotated to the position of FIGS. 7B and 8B, the gravitational torque attributable to arm 36 will be a minimum. Moment calculations within the skill of the art about axis 40 will disclose that with constant pressure, of a valve that depends on the weight of the arm 36 and the payload supplied to cylinder 135 the sum of the opposing moments equals zero whereby effects of the weight of the payload and the weight of the arm 36 is effectively reduced to zero, and hence all the power available from the joint/actuator can be used to accelerate the upper arm and payload. By comparison, when arm 36 is in the position of FIGS. 1, 2B, 7A, 9 and 10, the gravitational torque attributable to arm 36 will be at a maximum and hence the piston arm 136 is operated to move crank arms 138, 139 to their positions of FIGS. 7A so that the sum of the moments continue to balance out.

The end result is a symmetrical response to commands from the system controller since the arms 35 and 36 are always operated by cylinders 116 and 135 to maintain zero gravitational torque and reduced risk of injury or damages as the arms will not fall if power is lost.

It will be understood that an integrated revolute joint and actuator similar to that described in conjunction with FIG. 6 is located at the junction of robot base 115 and arm 35, and also at the junction of arms 35 and 36 so that hydraulic and pneumatic power can be transmitted through the robot arm sub-system to all actuators in the system with the result that intricate movements can be achieved as required by the work piece 10.

Although a preferred embodiment of the invention has been illustrated and described, it will be apparent to those skilled in the art that modifications may be made within the spirit and scope of the invention. Accordingly it is intended that the scope of the invention be defined not by the foregoing exemplary description but solely by the scope of the hereafter appended claims when interpreted in view of the relevant prior art.

We claim:

1. In a robot system having a first arm which is swingable about a first axis of rotation and arm extension means carried by and extending outwardly beyond the outer end portion of the first arm, the combination of
   a main gear operatively connected to the inner portion of the first arm, and
   drive means for said main gear, said drive means including
   means for rotating said first arm about said first axis in one direction of rotation,
   means for rotating said first arm about said first axis in the opposite direction of rotation, and
   means for eliminating backlash in said main gear and its driving system upon a change in the direction of rotation,
   said means for eliminating backlash between said main gear and its driving system including
   a first drive gear in engagement with said main gear,
   first hydraulic motor means which applies a constant preload torque to said first drive gear in a direction to drive said main gear in a first direction,
   a second drive gear in engagement with said main gear,
   second hydraulic motor means which applies a constant preload torque to said second drive gear in a direction to drive said main gear in a second direction opposed to said first direction, and
   means for selectively applying a driving torque greater than said preload torque to one of said drive gears to thereby overpower said other drive gear by said one drive gear and thereby drive the main gear in the direction of the drive gear to which said greater torque has been applied, and vice versa,
   whereby no dwell time occurs between rotation direction changes of said main gear resulting from the overpowering of a drive gear by the remaining drive gear and backlash is eliminated.

2. The combination of claim 1 further characterized in that
   said selective torque applying means includes a common hydraulic circuit connecting the two motors and valve means in the hydraulic circuit for applying a greater hydraulic pressure to a selected one of the two drive gears.

3. The robot system of claim 1 further characterized in that said first axis of rotation is vertical.

4. The combination of claim 3 further characterized in that
   said means for eliminating backlash between said main gear and its driving system includes
   a first drive gear in engagement with said main gear,
   first hydraulic motor means which applies a constant preload torque to said first drive gear in a direction to drive said main gear in a first direction,
   a second drive gear in engagement with said main gear,
   second hydraulic motor means which applies a constant preload torque to said second drive gear in a direction to drive said main gear in a second direction opposed to said first direction, and
   means for selectively applying a driving torque greater than said preload torque to one of said drive gears to thereby overpower said other drive gear by said one drive gear and thereby drive the main gear in the direction of the drive gear to which said greater torque has been applied, and vice versa,
   whereby no dwell time occurs between rotation direction changes of said main gear resulting from the overpowering of a drive gear by the remaining drive gear and backlash is eliminated.

5. The combination of claim 4 further characterized in that
   said selective torque applying means includes a common hydraulic circuit connecting the two motors and valve means in the hydraulic circuit for applying a greater hydraulic pressure to a selected one of the two drive gear.

* * * * *